United States Patent
Sato et al.

(10) Patent No.: US 6,759,468 B2
(45) Date of Patent: Jul. 6, 2004

(54) CURABLE FLUOROPOLYETHER BASE RUBBER COMPOSITIONS

(75) Inventors: Makoto Sato, Gunma-ken (JP); Shinichi Sato, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/995,618

(22) Filed: Nov. 29, 2001

(65) Prior Publication Data

US 2002/0095009 A1 Jul. 18, 2002

(30) Foreign Application Priority Data

Nov. 30, 2000 (JP) ........................................ 2000-364755

(51) Int. Cl.[7] ................................................. C08K 3/34
(52) U.S. Cl. ........................ 524/493; 524/544; 524/588; 524/730
(58) Field of Search ............................... 524/493, 544, 524/588, 730

(56) References Cited

U.S. PATENT DOCUMENTS 5,358,996 A * 10/1994 Takago et al. .............. 524/588
5,591,797 A * 1/1997 Barthel et al. .............. 524/493
5,674,966 A * 10/1997 McDermott et al. .......... 528/32
5,837,774 A * 11/1998 Tarumi et al. .............. 525/104

FOREIGN PATENT DOCUMENTS

| EP | 1 170 320 A1 | 1/2000 |
| EP | 1 033 387 A2 | 9/2000 |
| EP | 1 114 846 A2 | 7/2001 |

* cited by examiner

*Primary Examiner*—David W. Wu
*Assistant Examiner*—Henry S. Hu
(74) *Attorney, Agent, or Firm*—Birch, Stewart, Kolasch & Birch, LLP.

(57) ABSTRACT

A fluoropolyether base rubber composition comprising (A) a linear fluoropolyether compound containing at least two alkenyl groups and having a perfluoroalkyl ether structure in its backbone, (B) a surface hydrophobized silica filler having a specific surface area of at least 100 $m^2/g$ and a vinyl content of $1\times10^{-3}$ to $2\times10^{-2}$ mol/100 g, (C) a curing amount of an organosilicon compound having at least two SiH groups, and (D) a hydrosilylation catalyst is curable into products having improved compression set as well as water repellency, oil repellency, solvent resistance, chemical resistance and weather resistance and finding typical use as O-rings.

7 Claims, No Drawings

CURABLE FLUOROPOLYETHER BASE RUBBER COMPOSITIONS

This invention relates to a curable fluoropolyether base rubber composition which cures into products having improved compression set as well as water repellency, oil repellency, solvent resistance, chemical resistance and weather resistance and finding typical use as O-rings.

BACKGROUND OF THE INVENTION

Silica fillers including dry silica (known as fumed silica) and wet silica (known as precipitated silica) are commonly used in silicone rubber for reinforcement purposes and often surface treated to be hydrophobic. It is known that blending such hydrophobized silica filler in the curable fluoropolyether base rubber can remarkably improve the mechanical properties of the cured product thereof. The blending of hydrophobized silica filler provides fluoropolyether base rubber compositions with a good balance of heat resistance, chemical resistance, solvent resistance, water repellency, oil repellency, and weather resistance. The resultant compositions perform well in most applications.

Albeit satisfactory performance in most applications, the fluoropolyether base rubber compositions are required to have a lower compression set in the application where they are molded into O-rings or the like. An improvement in compression set properties remains outstanding.

SUMMARY OF THE INVENTION

An object of the invention is to provide a curable fluoropolyether base rubber composition which has improved compression set as well as heat resistance, chemical resistance, solvent resistance, water repellency, oil repellency, and weather resistance.

The present invention provides a curable fluoropolyether base rubber composition comprising (A) 100 parts by weight of a linear fluoropolyether compound containing at least two alkenyl groups in a molecule and having a perfluoroalkyl ether structure in its backbone, (B) 10 to 40 parts by weight of a silica filler having a specific surface area of at least 100 m$^2$/g and a vinyl content of $1 \times 10^{-3}$ to $2 \times 10^{-2}$ mol/100 g, which has been surface hydrophobized, (C) an effective amount to cure component (A) of an organosilicon compound having at least two hydrogen atoms each bound to a silicon atom in a molecule, and (D) a catalytic amount of a hydrosilylation catalyst. This fluoropolyether base rubber composition cures into products having improved compression set as well as heat resistance, chemical resistance, solvent resistance, water repellency, oil repellency, and weather resistance.

DESCRIPTION OF THE PREFERRED EMBODIMENTS

The respective components of the curable fluoropolyether base rubber composition are described below.

(A) Linear Fluoropolyether Compound

The linear fluoropolyether compound used herein as a base polymer in the composition is one containing at least two alkenyl groups in a molecule and having a divalent perfluoroalkyl ether structure in its backbone.

The alkenyl groups in the linear fluoropolyether compound are those having a CH$_2$=CH— structure at an end such as vinyl, allyl, propenyl, isopropenyl, butenyl and hexenyl, with the vinyl and allyl being especially preferred. The alkenyl groups may be attached either directly to both ends of the backbone of the linear fluoropolyether compound or to the backbone through a divalent linking group such as —CH$_2$—, —CH$_2$O— or —Y—NR—CO—. Herein Y is —CH$_2$— or a group of the following structural formula:

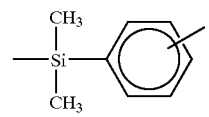

(the bond may be at o, m or p-position) and R is hydrogen, methyl, phenyl or allyl.

The perfluoroalkyl ether structure in the linear fluoropolyether compound includes those of the following general formula:

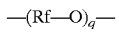

—(Rf—O)$_q$— wherein Rf is a straight or branched perfluoroalkylene group of 1 to 6 carbon atoms, preferably 1 to 3 carbon atoms, and letter q is an integer of 1 to 500, preferably 2 to 400, more preferably 10 to 200.

Examples of the recurring units —(Rf—O)— are shown below.

—CF$_2$O—, —CF$_2$CF$_2$O—, —CF$_2$CF$_2$CF$_2$O—, —CF(CF$_3$)CF$_2$O—, —CF$_2$CF$_2$CF$_2$CF$_2$O—, —CF$_2$CF$_2$CF$_2$CF$_2$CF$_2$CF$_2$O—, and —C(CF$_3$)$_2$O—.

Of these, —CF$_2$O—, —CF$_2$CF$_2$O—, —CF$_2$CF$_2$CF$_2$O—, and —CF(CF$_3$)CF$_2$O— are preferred. It is understood that the perfluoroalkyl ether structure may consist of recurring units —(Rf—O)— of one type or recurring units of two or more types.

Typical of the linear fluoropolyether compound (A) are those of the following general formula (1).

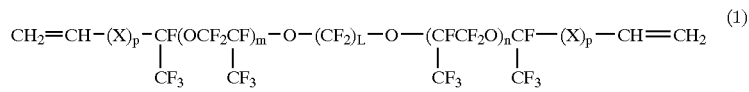

In formula (1), X is independently selected from among —CH$_2$—, —CH$_2$O— and —Y—NR—CO—, letter p is independently equal to 0 or 1, L is an integer of 2 to 6, and m and n are integers of 0 to 200, preferably 5 to 100. Y is —CH$_2$— or a group of the following structural formula:

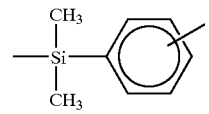

(the bond may be at o, m or p-position), and R is hydrogen, methyl, phenyl or allyl. These linear fluoropolyether compounds have a molecular weight of about 400 to 100,000 and preferably about 1,000 to 50,000.

Illustrative examples of the linear fluoropolyether compound of formula (1) are given below. In the following formulae, m and n are as defined above.

curable fluoropolyether base rubber composition. The silica filler may be either dry silica known as fumed silica or wet silica known as precipitated silica. For improving mechanical properties, the silica filler should be in particulate form and have a specific surface area of at least 100 m$^2$/g as measured by the hydrogen adsorption BET method.

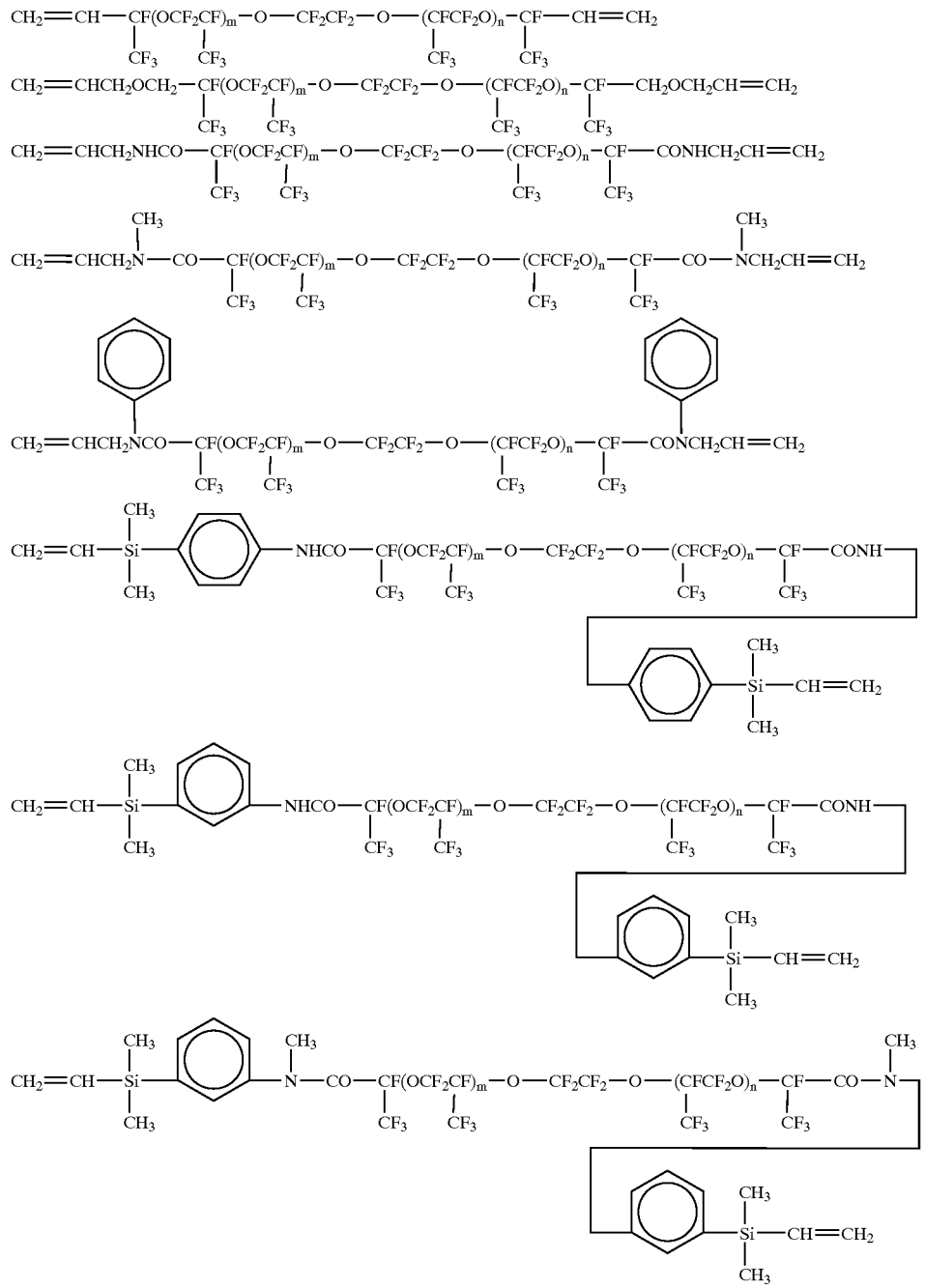

These linear fluoropolyether compounds may be used alone or in admixture of two or more.

(B) Silica Filler

The silica filler (B) is used for the purposes of achieving the reinforcement and improving the compression set of the In order that the silica filler be effective to improve compression set, surfaces of silica particles must be treated with a surface treating agent. More particularly, hydroxyl groups bound to silicon atoms on silica surfaces must be treated with an organosilicon compound comprising a monomer having a hydrolyzable group or a partial hydrolyzate thereof whereby the silica surfaces are covered with $CH_2=CH-Si-$ groups or vinyl groups.

The surface treating agents capable of covering silica surfaces with $CH_2=CH-Si-$ groups or vinyl groups are not particularly limited as long as they are silicon compounds having vinyl and hydrolyzable groups. Illustrative of suitable silicon compounds are organochlorosilanes such as vinyldimethylchlorosilane and divinyldichlorosilane, organoalkoxysilanes such as dimethylvinylmethoxysilane and divinyldiethoxysilane, and silazane compounds such as 1,3-divinyltetramethylsilazane and 1,3-dimethyltetravinylsilazane.

The silica filler to be treated with the surface treating agent is preferably in the powder particle state ready to direct treatment. For the surface treatment, conventional well-known methods may be employed. For example, untreated silica particles and the surface treating agent are admitted into a mechanical kneading apparatus which is closed under atmospheric pressure or into a fluidized bed. Mixing is done at room temperature or elevated temperature and optionally, in a blanket of inert gas. As the case may be, water and a catalyst are used for promoting hydrolysis. At the end of kneading, the silica particles are dried. The amount of the surface treating agent used may be at least the amount calculated from the surface area to be covered with the agent.

The thus treated silica should have a vinyl group content of $1\times10^{-3}$ to $2\times10^{-2}$ mol/100 g in order that it serve to improve compression set without detracting from mechanical properties. Silica with a vinyl content of less than $1\times10^{-3}$ mol/100 g fails to achieve the desired compression set improving effect whereas silica with a vinyl content of more than $2\times10^{-2}$ mol/100 g acts to lower strength and elongation and substantially detract from mechanical properties.

It is noted that the vinyl content on surface of the treated silica filler can be determined by adding an alkali (e.g., KOH) to the treated silica, heating at 300° C., and measuring the quantity of ethylene gas evolved by heating, using a gas chromatograph.

Additionally, in order to restrain the composition having the treated silica filler admixed therein from thickening due to agglomeration in the course of aging, for thereby improving the moldability, the treated silica filler should also be hydrophobized by treating hydroxyl groups attached to silicon atoms on silica surfaces.

The type of the hydrophobizing agent is not critical although surface treating agents capable of covering silica surfaces with $(CH_3)_n-Si-$ groups wherein n is an integer of 1 to 3 are preferred, for example, organochlorosilanes, silazane compounds, cyclic silazane compounds, and dimethylpolysiloxanes having a low degree of polymerization.

The hydrophobizing treatment is preferably carried out in the same way as with the surface treating agent capable of covering silica surfaces with $CH_2=CH-Si-$ groups or vinyl groups. The silica filler may be surface treated with the hydrophobizing agent after or at the same time as the surface treatment with the surface treating agent capable of covering silica surfaces with $CH_2=CH-Si-$ groups or vinyl groups.

An appropriate amount of the silica filler (B) blended is 10 to 40 parts, and preferably 15 to 30 parts by weight per 100 parts by weight of component (A). Less than 10 parts of component (B) is too small to improve mechanical properties whereas more than 40 parts of component (B) invites an excessive rise of viscosity and is difficult to compound.

(C) Organosilicon Compound

The organosilicon compound (C) functions as a crosslinking agent and chain extender for component (A). Any organosilicon compound is useful as long as it has at least two hydrogen atoms each bound to a silicon atom, that is, hydrosilyl (SiH) groups in a molecule. With the compatibility with and dispersibility in component (A), and uniformity after curing taken into account, organosilicon compounds having at least one monovalent perfluorooxyalkyl group, monovalent perfluoroalkyl group, divalent perfluorooxyalkylene group or divalent perfluoroalkylene group as well as at least two, preferably at least three hydrosilyl groups (or SiH groups) are preferred.

The perfluorooxyalkyl, perfluoroalkyl, perfluorooxyalkylene and perfluoroalkylene groups include the groups of the following general formulae.

Monovalent Perfluoroalkyl Groups:

m is an integer of 1 to 20, preferably 2 to 10.

Divalent Perfluoroalkylene Groups

m is an integer of 1 to 20, preferably 2 to 10.

Monovalent Perfluorooxyalkyl Groups:

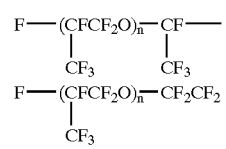

n is an integer of 1 to 5.

Divalent Perfluorooxyalkylene Groups:

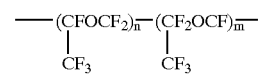

m is an integer of 1 to 50, n is an integer of 1 to 50, and m+n is an integer of 2 to 100.

m and n each are an integer of 1 to 50.

These perfluoro(oxy)alkyl and perfluoro(oxy)alkylene groups each may be attached either directly to a silicon atom or to a silicon atom through a divalent linking group. The divalent linking group is an alkylene group, arylene group or a mixture thereof, which may further have an ether bond oxygen atom, amide bond or carbonyl bond. Such divalent linking groups of 2 to 12 carbon atoms are preferred. Illustrative examples thereof include

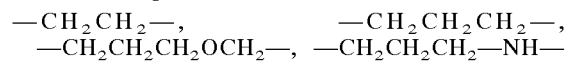

CO—, —CH$_2$CH$_2$CH$_2$—N(Ph)—CO—, —CH$_2$CH$_2$CH$_2$—N(CH$_3$)—CO—, and —CH$_2$CH$_2$CH$_2$—O—CO—
wherein Ph is phenyl.

In addition to the monovalent organic group containing a monovalent or divalent fluorinated substituent, that is, a perfluoroalkyl, perfluorooxyalkyl, perfluoroalkylene or perfluorooxyalkylene group, the organosilicon compound (C) may have a monovalent substituent attached to a silicon atom. Exemplary monovalent substituents are substituted or unsubstituted hydrocarbon groups of 1 to 20 carbon atoms including alkyl groups such as methyl, ethyl, propyl, butyl, hexyl, cyclohexyl, octyl and decyl; alkenyl groups such as vinyl and allyl; aryl groups such as phenyl, tolyl, and naphthyl; aralkyl groups such as benzyl and phenylethyl; and substituted ones of these groups in which some of the hydrogen atoms are replaced by chlorine atoms, cyano groups or the like, such as chloromethyl, chloropropyl, and cyanoethyl.

The organosilicon compound (C) may be cyclic, chainlike or three-dimensional network or a mixture thereof. The number of silicon atoms in the molecule of the organosilicon compound is not critical although it desirably has about 2 to about 60 silicon atoms, and especially about 3 to about 30 silicon atoms.

Illustrative examples of the organosilicon compound are given below. They may be used alone or in admixture of two or more. In the formulae, Me is methyl and Ph is phenyl.

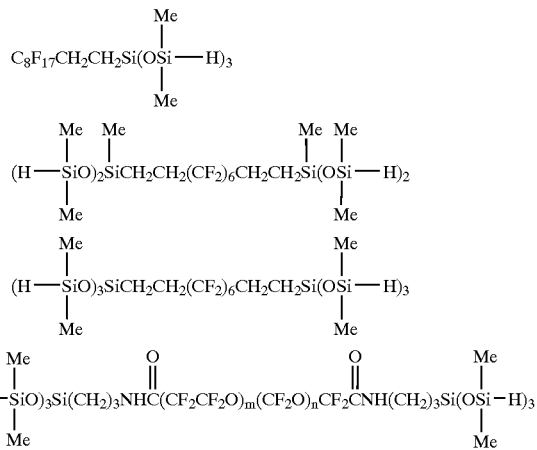

Note that m is an integer of 1 to 20, averaging to 10, and n is an integer of 1 to 10, averaging to 6.

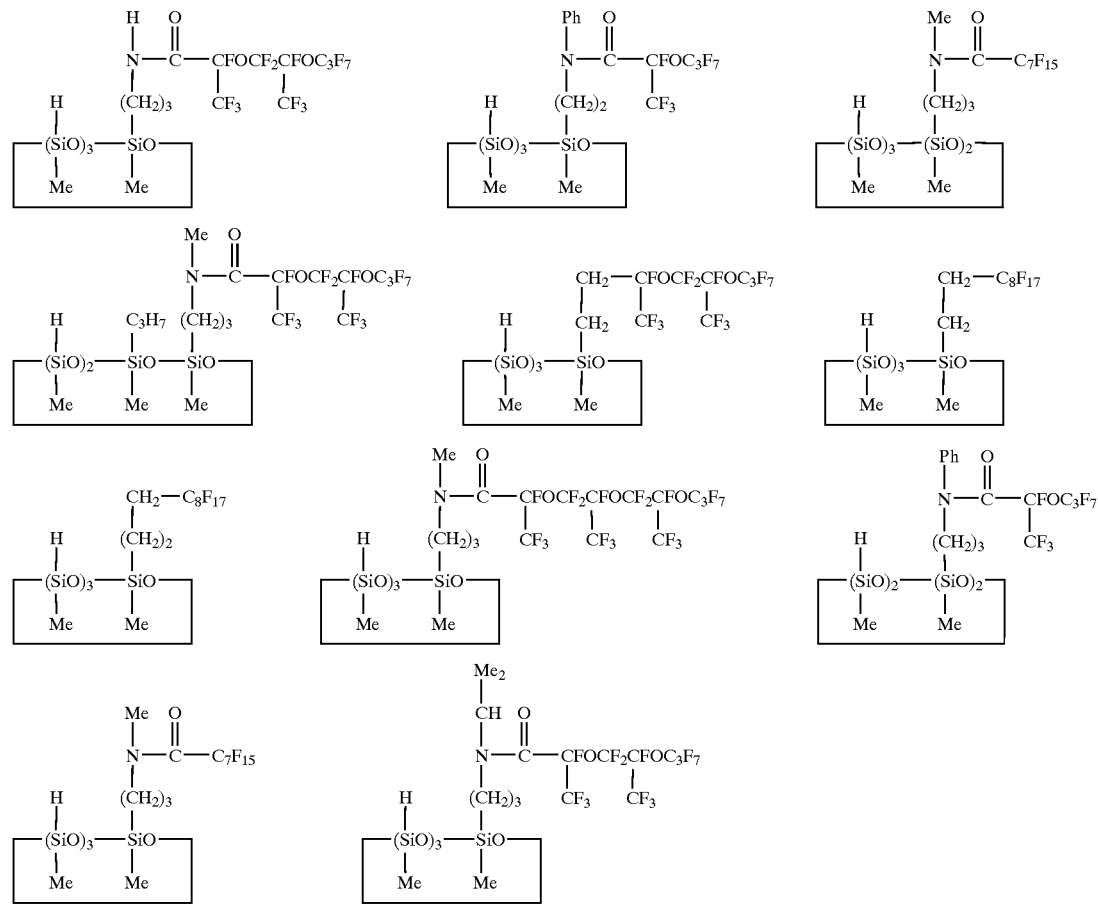

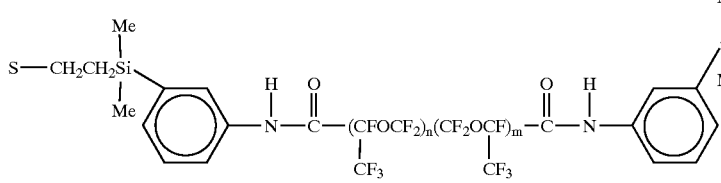
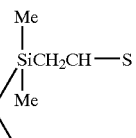

Note that S is

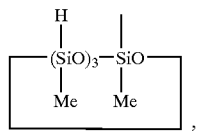

n is an integer of 1 to 30, m is an integer of 1 to 30, and n+m is 2 to 60, averaging to 2 to 50.

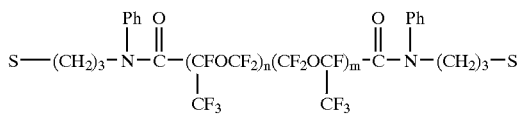

Note that S is

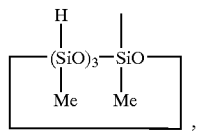

n is an integer of 1 to 30, m is an integer of 1 to 30, and n+m is 2 to 60, averaging to 2 to 50.

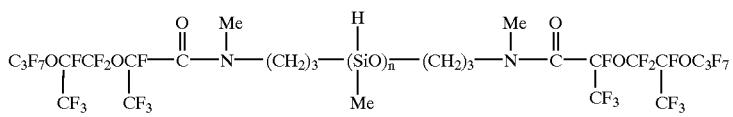

Note that n is an integer of 2 to 60, averaging at 3 to 50.

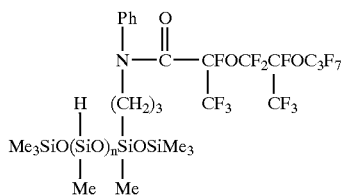

Note that n is an integer of 2 to 60, averaging at 3 to 50.

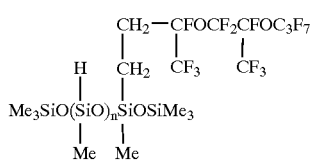

Note that n is an integer of 2 to 60, averaging at 3 to 50.

Component (C) is blended in an effective amount to cure component (A). Usually, component (C) having hydrosilyl groups is blended in such an amount that preferably 0.5 to 5 mol, and more preferably 1 to 2 mol of hydrosilyl (or SiH) groups may be present per mol of alkenyl groups (e.g., vinyl, allyl or cycloalkenyl) in the entire composition, especially component (A). Less amounts of component (C) may achieve an insufficient degree of crosslinking. Excessive amounts of component (C) may allow chain lengthening to become preferential, inviting undercure, foaming, and losses of heat resistance and compression set. Differently stated, the amount of component (C) blended can generally be 0.1 to 50 parts by weight per 100 parts by weight of component (A).

(D) Hydrosilylation Catalyst

The hydrosilylation catalyst (D) is preferably selected from transition metals, for example, platinum group metals such as Pt, Rh and Pd, and compounds of transition metals. Most of these compounds are noble metal compounds which are expensive. Platinum and platinum compounds are thus used because they are readily available.

Exemplary platinum compounds include chloroplatinic acid, complexes of chloroplatinic acid with olefins such as ethylene, complexes of chloroplatinic acid with alcohols and vinylsiloxanes, and platinum supported on silica, alumina or carbon though not limited thereto. Known platinum group metal compounds other than the platinum compounds include rhodium, ruthenium, iridium, and palladium compounds, for example, $RhCl(PPh_3)_3$, $RhCl(CO)(PPh_3)_2$, $RhCl(C_2H_4)_2$, $Ru_3(CO)_{12}$, $IrCl(CO)(PPh_3)_2$, and $Pd(PPh_3)_4$ wherein Ph denotes phenyl.

The amount of the catalyst used is not critical. A catalytic amount can achieve a desired curing rate. The catalytic amount varies depending on the form and concentration of the catalyst, that is, whether or not the catalyst is supported on a carrier such as silica or alumina and whether or not the catalyst is diluted with a solvent. From the economical aspect and to obtain satisfactory cured products, the platinum group metal compound is preferably added in an amount of 0.1 to 1,000 parts, more preferably 0.1 to 500 parts by weight calculated as the platinum group metal per million parts by weight of the entire curable composition.

Other Components

Insofar as the benefits of the invention are not impaired, various well-known additives may be added to the inventive composition in addition to the above essential components (A) to (D). Such optional additives include regulators of the hydrosilylation catalyst, for example, acetylene alcohols such as 1-ethyl-1-hydroxycyclohexane, 3-methyl-1-butyn-3-ol, 3,5-dimethyl-1-hexyn-3-ol, 3-methyl-1-penten-3-ol, and phenylbutynol, as well as 3-methyl-3-penten-1-yn and 3,5-dimethyl-3-hexen-1-yn; tackifiers, for example, organosiloxanes having alkoxy, epoxy and SiH groups in the molecule such as the compound shown below; pigments such as iron oxide, cerium oxide and carbon black; colorants, dyes, and antioxidants.

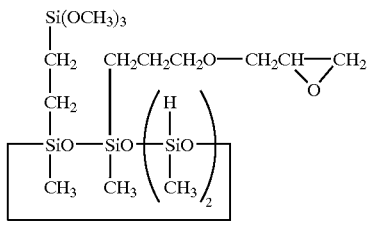

Depending on its application, the rubber composition of the invention is formulated as a single composition having all the essential components (A) to (D) incorporated therein, that is, of one part type. Alternatively, the rubber composition is formulated to two part type, for example, one part containing a part of (A), a part of (B) and (C) and the other part containing the balance of (A), the balance of (B) and (D) whereupon the two parts are mixed on use.

The composition of the invention will cure when it is allowed to stand at room temperature or by heating. Often, the composition is preferably cured by heating at a temperature from room temperature (e.g., 10–30° C.) to about 200° C. for about 5 minutes to about 24 hours.

The compositions of the invention are useful in a wider variety of applications and suitable for use as molded rubber parts such as diaphragms and sealing parts (e.g., O-rings, gaskets and grommets) where chemical resistance and oil resistance are required when such parts are used in chemical plants, business machines (e.g., copiers and printers), automotive and aircraft, semiconductor devices, medical equipment, analytic instruments, etc.

EXAMPLE

Examples of the invention are given below by way of illustration and not by way of limitation. All parts are by weight. The viscosity is a measurement at 25° C.

Example 1

To 100 parts of a polymer of formula (2) shown below (viscosity 4.4 Pa·s, average molecular weight 16500, and vinyl content 0.012 mol/100 g) was added 25 parts of silica which had been surface treated with dimethyldichlorosilane and vinyldimethylchlorosilane (specific surface area 186 m$^2$/g and vinyl content $1\times10^{-2}$ mol/100 g) as the silica filler. They were mixed in a planetary mixer, kneaded for one hour, then mixed and heat treated at 170° C. for 2 hours, and dispersion milled on a three-roll mill, obtaining a base compound.

It is noted that the vinyl content of the treated silica was determined by adding KOH to the treated silica, heating at 300° C., and measuring the quantity of ethylene gas evolved by heating, using a gas chromatograph.

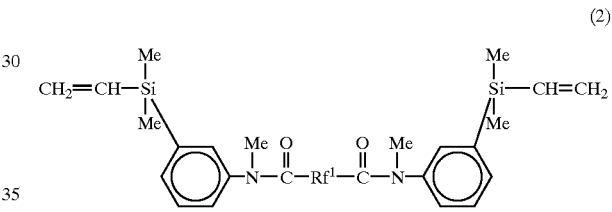

(2)

Note that Rf$^1$ is

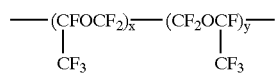

wherein x+y=97 (average) and Me is methyl.

To 125 parts of the base compound were added 0.2 part of a toluene solution of a catalyst in the form of chloroplatinic acid modified with a compound of the following formula (3) (platinum concentration 0.5 wt %), 0.4 part of a 50% toluene solution of ethynyl cyclohexanol and 3.35 parts of a SiH group-bearing organosilicon compound of the following formula (4). Intimate mixing gave a curable fluoropolyether base rubber composition.

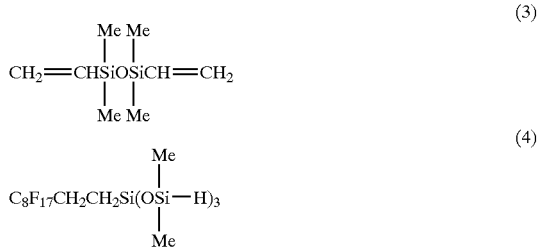

The composition was press molded at 150° C. for 5 minutes and post-cured in an oven at 200° C. for 4 hours, obtaining a sheet of 2 mm thick and a ball for compression set measurement as prescribed by JIS K6262. Physical properties of the cured rubber were measured according to JIS K6250. The results are shown in Table 1.

Comparative Example 1

A base compound was prepared as in Example 1 except that silica which had been surface treated only with dimethyldichlorosilane (specific surface area 180 m²/g and vinyl content 0 mol/100 g) was used as the silica filler. As in Example 1, the base compound was mixed with the remaining ingredients to formulate a curable fluoropolyether base rubber composition.

As in Example 1, samples were prepared from the composition and measured for physical properties. The results are also shown in Table 1.

TABLE 1

| | Rubber physical properties | | | |
|---|---|---|---|---|
| | Hardness (Durometer type A) | Tensile strength (MPa) | Elongation at break (%) | Compression set (%) |
| Example 1 | 50 | 11.9 | 370 | 6.3 |
| Comparative Example 1 | 48 | 12.1 | 390 | 28.6 |

Note that the compression set was measured after heating at 200° C. for 24 hours.

There has been described a curable fluoropolyether base rubber composition which cures into products having improved compression set. The cured products possess water repellency, oil repellency, solvent resistance, chemical resistance and weather resistance inherent to fluoropolyether base rubber. They are advantageously used as O-rings and the like.

Japanese Patent Application No. 2000-364755 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A curable fluoropolyether base rubber composition comprising
   (A) 100 parts by weight of a linear fluoropolyether compound containing at least two alkenyl groups in a molecule and having a perfluoroalkyl ether structure in its backbone,
   (B) 10 to 40 parts by weight of a silica filler having a specific surface area of at least 100 m²/g, wherein hydroxyl groups bound to silicon atoms on silica surfaces in said silica filler are linked to $CH_2$=$CHSiO$— or vinyl groups so that said silica filler has a vinyl content of $1 \times 10^{-3}$ to $2 \times 10^{-2}$ mol/100 g, which silica filler has been surface hydrophobized by replacing remaining hydroxyl groups with $(CH_3)_nSiO$— groups wherein n is an integer of 1 to 3,
   (C) an effective amount to cure component (A) of an organosilicon compound having at least two hydrogen atoms each bound to a silicon atom in a molecule, and
   (D) a catalytic amount of a hydrosilylation catalyst.

2. The composition of claim 1 wherein the linear fluoropolyether compound (A) is of the following general formula (1):

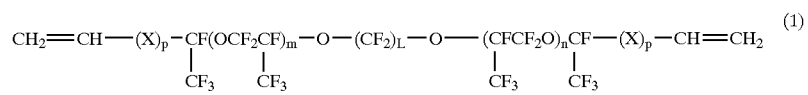

wherein X is independently —$CH_2$—, —$CH_2O$— or —Y—NR—CO— wherein Y is —$CH_2$— or a group of the following structural formula:

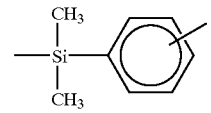

and R is hydrogen, methyl, phenyl or allyl, letter p is independently equal to 0 or 1, L is an integer of 2 to 6, and m and n each are an integer of 0 to 200.

3. The composition of claim 1, wherein the silica filler (B) is obtained by surface treating silica particles with a surface treating agent selected from the group consisting of vinyldimethylchlorosilane, divinyldichlorosilane, dimethylvinylmethoxysilane, divinyldiethoxysilane, 1,3-divinyltetramethylsilazane, and 1,3-dimethyltetravinylsilazane.

4. The composition of claim 1, wherein the organosilicon compound (C) has at least one monovalent perfluorooxyalkyl group, monovalent perfluoroalkyl group, divalent perfluoroxyalkylene group, or divalent pefluoroalkylene group as well as three hydrosilyl groups in a molecule.

5. The composition of claim 1, wherein the hydrosilation catalyst (D) is a platinum group compound.

6. The composition of claim 1, comprising 0.1 to 50 parts by weight of component (C) per 100 parts by weight of component (A).

7. A molded rubber article, selected from the group consisting of O-rings, gaskets, grommets, and diaphragms, formed from the composition of claim 1.

* * * * *